United States Patent [19]

Tison

[11] 4,132,025
[45] Jan. 2, 1979

[54] GANGION ENWRAPMENT CONTROL APPARATUS FOR LONG LINE HAULERS

[75] Inventor: Kenneth F. Tison, Federal Way, Wash.

[73] Assignee: Marine Construction & Design Co., Seattle, Wash.

[21] Appl. No.: 813,819

[22] Filed: Jul. 8, 1977

[51] Int. Cl.$^2$ ............................................. A01K 91/00
[52] U.S. Cl. .............................................. 43/4; 43/8; 43/27.4; 57/283; 57/352
[58] Field of Search .................. 43/4, 8, 27.4; 57/77.4, 57/106

[56] References Cited

U.S. PATENT DOCUMENTS

| 2,810,979 | 10/1957 | Puretic ......................................... 43/8 |
| 3,070,916 | 1/1963 | Luketa ....................................... 43/8 X |
| 3,626,630 | 12/1971 | Tison ..................................... 43/27.4 X |
| 3,747,317 | 7/1973 | Willis ........................................ 57/106 |
| 3,903,632 | 9/1975 | Tison et al. ......................... 43/27.4 X |

FOREIGN PATENT DOCUMENTS 511151 12/1920 France ............................................ 43/4

*Primary Examiner*—Nicholas P. Godici
*Assistant Examiner*—James G. Smith
*Attorney, Agent, or Firm*—Christenson, O'Connor, Johnson & Kindness

[57] ABSTRACT

A control device to prevent or limit gangion enwrapment on long lines including means mounting a line-deflecting guide roller to vary the angular relationship between the roller axis and the plane defined between the line stretches extending to and from the deflecting roller during line hauling. Angular displacement of such guide roller to either side of a neutral position under operator control induces twisting in the approaching long line one way or the other so as to prevent or eliminate gangion enwrapment.

7 Claims, 6 Drawing Figures

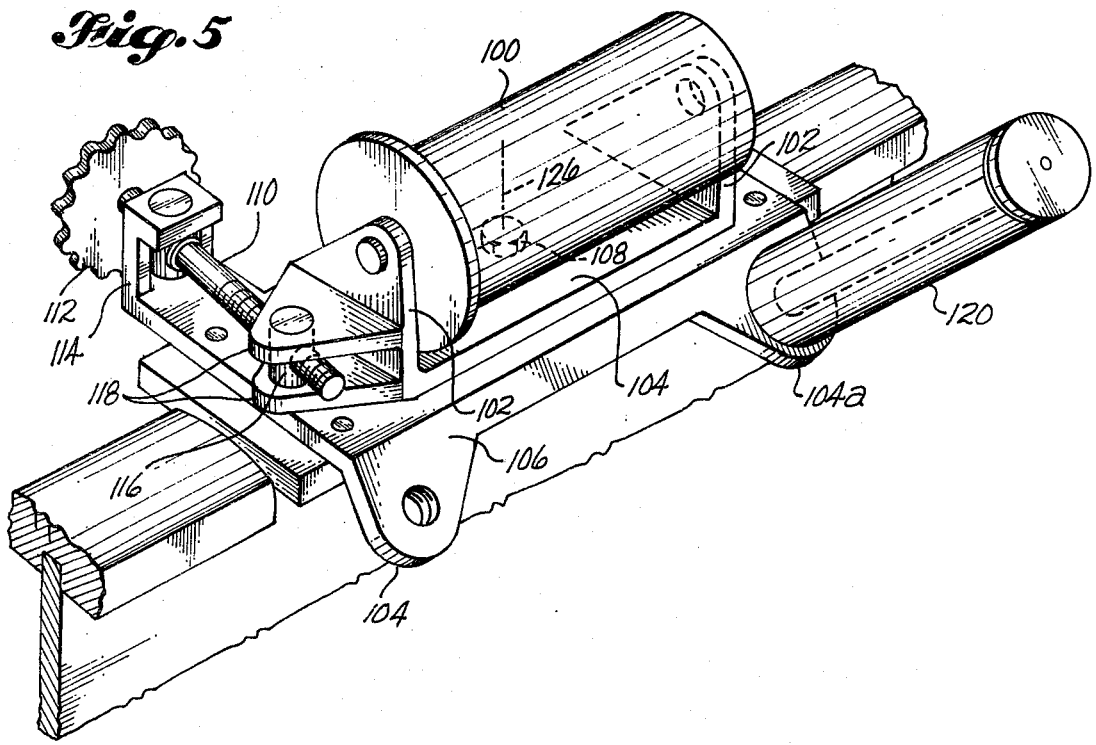
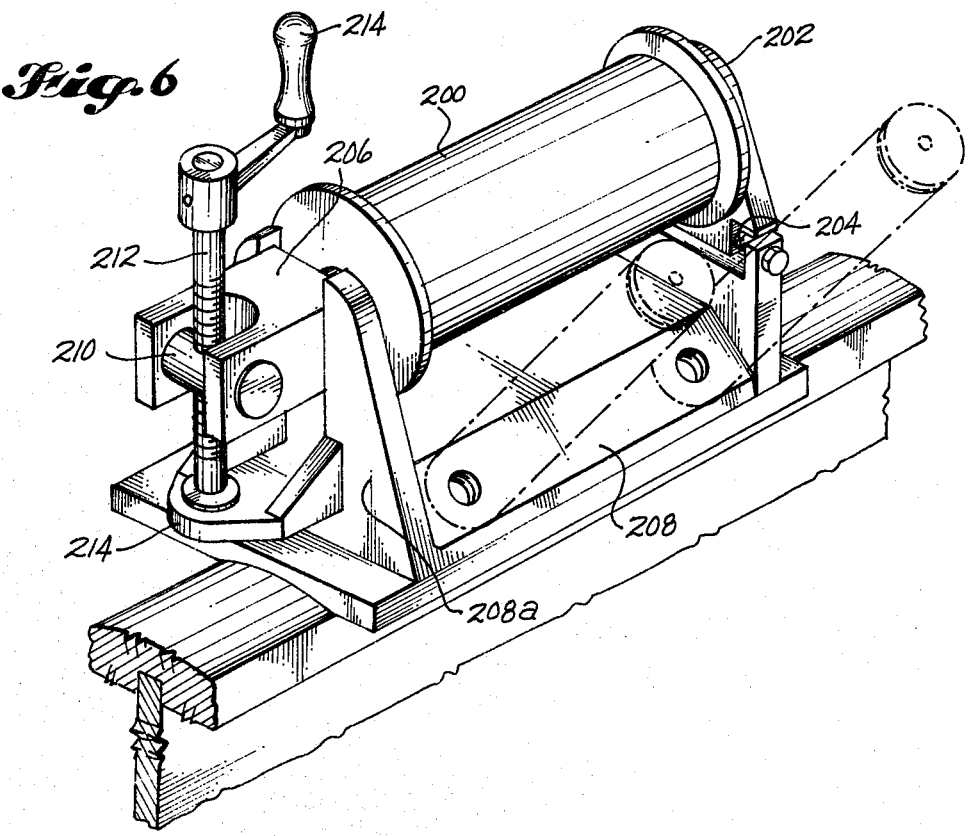

GANGION ENWRAPMENT CONTROL APPARATUS FOR LONG LINE HAULERS

BACKGROUND OF THE INVENTION

This invention relates to mechanisms for the hauling and storing of long lines such as those used in cod and halibut fishing, and more specifically concerns a means enabling the equipment operator to limit or reduce the extent to which gangions are permitted or caused to enwrap the ground line operations. The operator is thus enabled to reduce the loss of time incurred during hauling to free enwrapped gangions so that they may be secured separately in orderly manner or otherwise suitably stored. The invention is herein illustratively described by reference to the presently preferred embodiments thereof; however, it will be recognized that certain modifications and changes therein with respect to details may be made without departing from the essential features involved.

While gangion enwrapment during a set occurs in varying degrees and from uncontrolled causes, the principal problem with which the invention is concerned is gangion enwrapment that is caused by the action of the hauling gear itself, that which tends to twist the ground line progressively during hauling due to the unbalance of forces exerted by guide rollers on the line. Equipment operators have been aware of this problem for some time and have been forced to deal with it, complicating or delaying the hauling process.

A specific object of this invention is to provide an effective and reliable method and apparatus for the described purpose, namely an apparatus that is an efficient and effective operator-controlled means to solve the problem of gangion enwrapment. A further object hereof is to devise such apparatus that is relatively inexpensive to install, is readily adapted to existing hauling gear, and that requires no appreciable additional space aboard the vessel.

BRIEF DESCRIPTION OF THE INVENTION

In accordance with this invention, in the preferred embodiment a line hauling operator stationed at the vessel's rail to remove the fish as they come aboard over the guide roller, observes the wrap condition of the surfacing gangions on the ascending ground line and on the basis of his observations, by selectively adjusting the positioning of a line guide roller, produces a controlled, counteractive twisting action in the approaching ground line. Because the ground line itself is thus induced to undergo a progressive twisting as it approaches the rail, the effect is like that of swinging the gangions in an unwrapping direction. Thus, even though they are not actually swung about the ground line, they may be effectively unwrapped by the time they come over the rail roller, and whether or not they carry fish.

For this purpose the line guide means includes the usual guide roller mounted at the rail as a bearing and deflection guide for the incoming ground line. Deflected around the roller, the incoming stretch of line and the stretch that extends across the deck to the spooling apparatus defines a plane. Movable support means for the guide roller normally orienting the roller generally at right angles to said plane is selectively pivoted about a mounting axis under control of the operator during the line hauling to adjustively vary the orientation angle of the roller axis in relation to said plane. By this means the operator is enabled to cause controlled twisting of the incoming ground line for the described purpose. Angular shifting of the guide roller in one direction relative to said plane induces twisting in one direction, whereas opposite shifting in relation to said plane induces opposite twisting of the ground line. Any suitable means may be used to selectively vary orientation of the roller for this purpose, whether operated manually, electrically, or hydraulically and may be operated as necessary to keep the gangions unwrapped without impeding or otherwise inconveniencing the operator. In fact, the operator is already required to monitor the long line as it emerges from the water in preparation for handling the catch and removing any foreign materials caught on the hooks or tangles that occur, so that he simply conducts the roller angle control operation as part of his watch.

In terms of physical mounting arrangements that may be utilized, the desired results may be achieved by any of various mechanical arrangements to vary orientation of the guide roller. These include mounting the roller support to pivot in a horizontal plane, in a vertical plane, or in an inclined plane. Augmented effect of the guide roller to produce ground line twisting during hauling may be achieved by shaping the roll surface concavely, tapered from its ends toward its midportion. Also, if desired the novel gangion enwrapment control principle may be applied using a control assembly mounted at an inboard position on deck to deflect the ground line in a plane defined by stretches extending from the control device roller to the hauling gear in one direction and to an independent guide roller at the rail in the opposite direction, especially can this be a feasible rearrangement on large fishing boats where there is plenty of room to form the line stretch extending across the deck that must be observed for gangion enwrapment during hauling.

These and other features, objects and advantages of the invention will become fully evident from the following description thereof and by reference to the accompanying drawings.

BRIEF DESCRIPTION OF THE DRAWINGS

FIG. 5 is an isometric view of apparatus designed to operate generally on the principle of that shown in FIGS. 1 to 4 inclusive, but with a manual means for variably adjusting the angular orientation of the guide roller in a horizontal plane.

FIG. 6 is another modification illustrating a manually operated means to control axial orientation on the guide roller in a vertical plane.

DETAILED DESCRIPTION WITH REFERENCE TO THE DRAWINGS

With reference to the drawings, hauling of a long line L aboard a fishing vessel V in the illustrated case is carried out through use of a combined power-driven hauling block W and an associated powered spooling device S with a special direction-changing guide sheave D. It also uses the variably positioned guide means G comprising this invention. The long line L itself consists of the usual ground line A to which gangions B are secured at intervals along the length thereof in usual manner. With the ground line A wedged in the re-entrant groove of the power-driven hauling block W, the line thereafter passes around the guide sheave D from which it leads to the storage reel in the spooling device S. Drive power applied to the hauling sheave W exerts the force necessary to pull in the long line. The correct amount of winding tension in the line as it wraps around the storage spool S1 is established by a separate low-torque drive means (not shown) that turns the reel S1 while the hauling block W is operating. A person stationed adjacent the spooling device S places the gangion hooks on reel spokes for storage purposes in an orderly manner as they arrive as disclosed in U.S. Pat. Nos. 3,626,630; 3,841,011; and 3,903,632. Preferably, operation of the spooling device S includes conventional means (not shown) that produces lateral oscillation of the reel S1 accompanying driven rotation of such reel so as to achieve level winding of the ground line on the reel. When ready for making another set, re-orientation of the spooling device permits paying out the long line through the automatic baiting mechanism H, which may be of the type disclosed in U.S. Pat. Nos. 3,626,630 or 3,841,011.

These and other or alternative devices for hauling, spooling and otherwise handling the long line in conjunction with use of the invention may vary according to preference.

Figure 4:
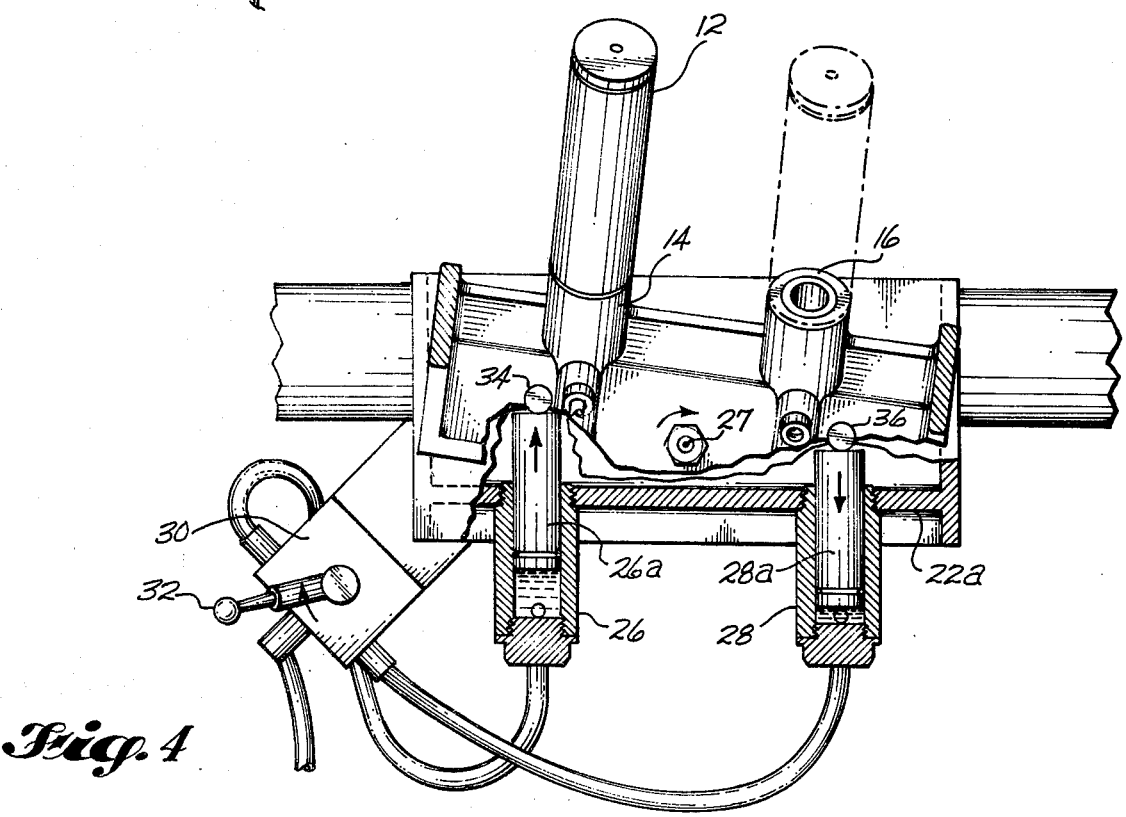
FIG. 4 is a view similar to FIG. 3 with parts broken away to illustrate details of construction of the first embodiment and to illustrate the use of two restraining rollers associated with the angularly adjustable guide roller.

In accordance with this invention, the long line being hauled is guided upward and over the rail of the vessel V on a generally horizontal guide roller 10. The surface of this roller is preferably rubberized or otherwise treated to provide a moderate degree of traction on the ground line A for purposes of inducing twisting in the ground line while it is passing over the roller. If the operator hauls with the vessel moving slowly aft as shown by the direction of the arrow F in FIG. 1, or if the current in which hauling is done causes such relative motion in the water, it is desirable to employ an upright keeper roller 12 outboard from the forward end portion of the generally horizontal guide roller 10 so as to maintain the long line on the roller 10. In some instances a keeper roller placed outwardly of the aft end of the guide roller 10 is also desirable. To mount these keeper rollers, there are mounting sockets 14 and 15 adjacent the ends of the roller mount assembly (FIG. 4).

Figure 1:
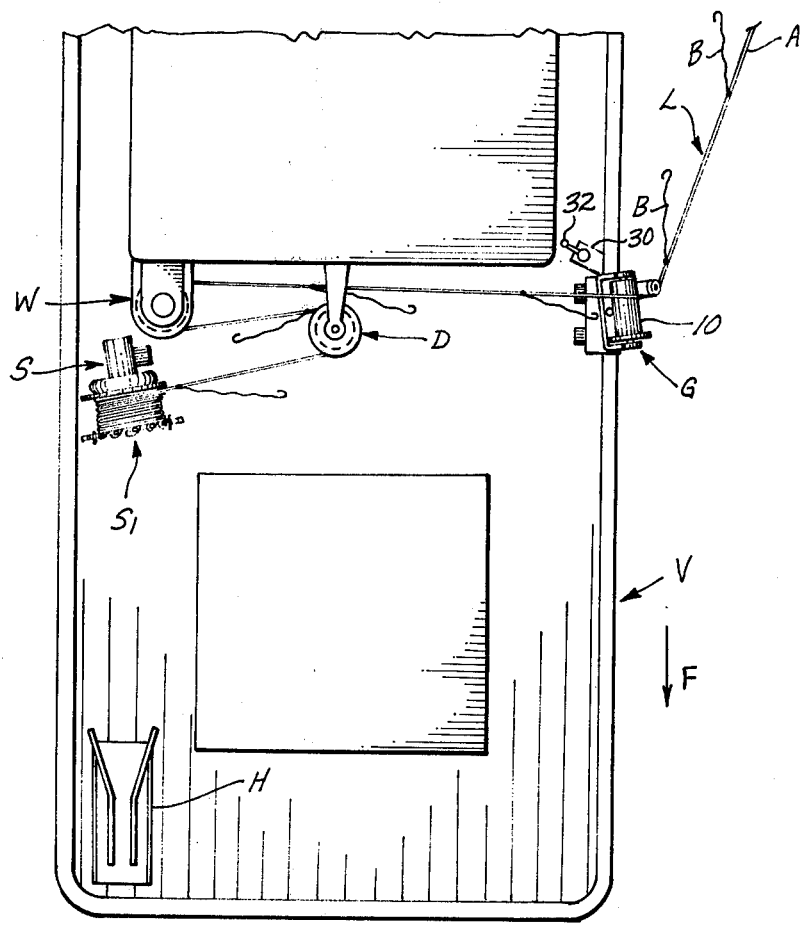
FIG. 1 is a plan view of the aft portion of a fishing vessel illustrating a long line hauling, spooling and variably adjustable guiding arrangement in accordance with this invention.
Figure 2:
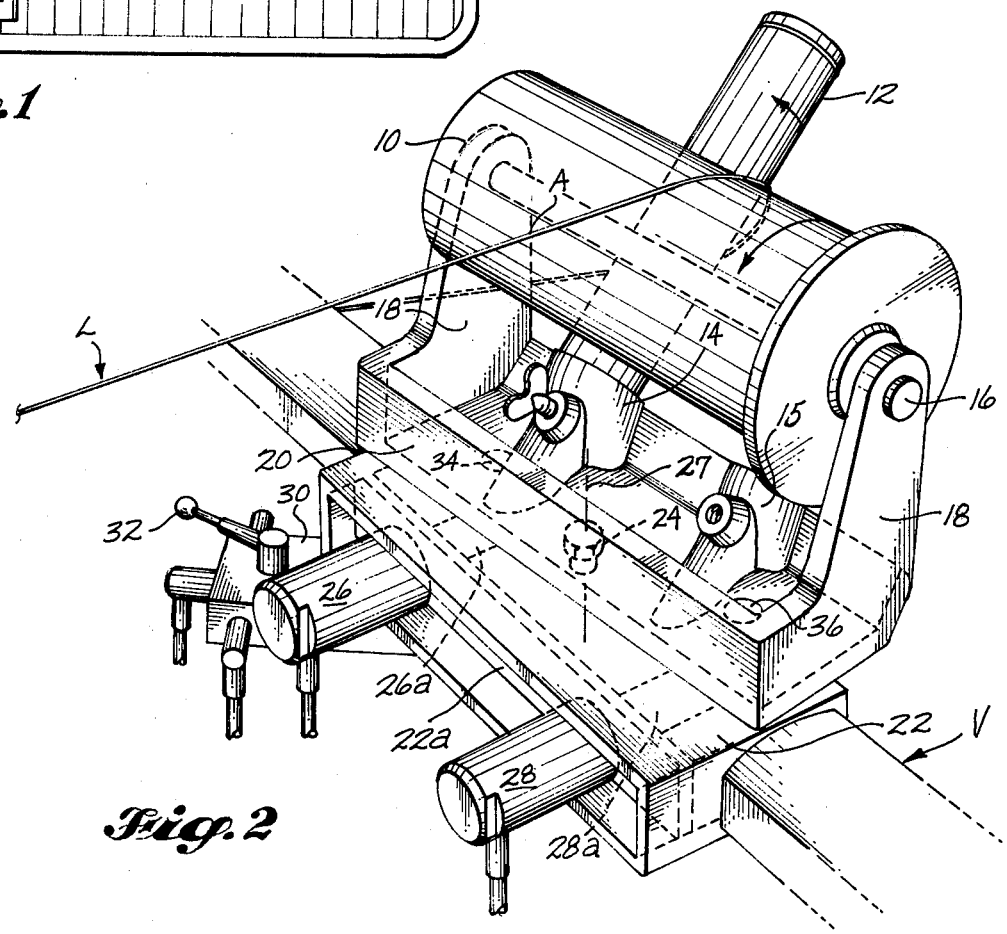
FIG. 2 is an isometric view illustrating the preferred operator-controlled adjustable line guide means.

In the embodiment of the invention depicted in FIGS. 1 to 4, generally horizontal guide roller 10 is rotationally supported on stub shafts 16 journaled in upright support arms 18 that form part of a mounting block 20. Mounting block 20 carrying the guide roller 10 and keeper rollers in turn is supported on a rail-mounted base 22 in such a position that the outboard side of the guide roller 10 stands outboard somewhat to clear the side of the vessel. Mounting block 20 is secured to base 12 by a pivotal connection 24 so as to be movable about an upright axis 27 as shown (FIG. 2).

Hydraulic cylinders 26 and 28 incorporating pusher pistons 26a and 28a respectively, are mounted on an inboard side wall 22a of stationary rail-mounted base 22 and are selectively pressurizable differentially by means of a control valve 30 operated by control lever 32. A pressure source (not shown) extending to the control valve delivers sufficient pressure that with movement of the valve handle 32 from its neutral position in one direction, one pusher piston is projected while the other is permitted to retract a corresponding amount under the force applied by the first piston, and vice versa. The respective pusher pistons 26a and 28a bear against stops or pins 34 and 36 fixed on the underside of the pivotal mounting block 20 at equal distances fore and aft respectively from the pivot axis 26. Thus, a momentary displacement of the valve control lever 32 on one side or the other of the neutral position causes the guide roller assembly to move clockwise or counterclockwise during the displacement to vary the twisting effect the roller has on the ground line. The hydraulic source pressure is high enough to maintain the assembly in any assigned position against ground line forces acting on the rollers. With only a little practice the operator readily develops the skill needed to make corrective adjustments of the roller position to induce the proper amount and direction of twisting in the incoming ground line.

Keeper roller 12 is a free turning roller as is guide roller 10. Rollers of this general type are commonly used to guide and deflect a ground line over the rail of a vessel to the spooling apparatus. However, in conventional installations the angular positioning of these rollers is stationary. As previously stated it is found that gangion enwrapment around the ground line, although often occuring as an incident of the set itself, is caused or aggravated primarily by the inevitable twisting of the ground line imposed by the guide roller itself in conventional installations. The amount of twisting action thus commonly experienced depends upon the orientation of the vessel in relation to the plane defined by the incoming stretch and departing stretch of ground line in relation to and from the guide roller. This relative orientation, of course, varies from haul to haul, and varies during the course of a haul as the position of the vessel changes or as currents act on the gear.

Figure 3:
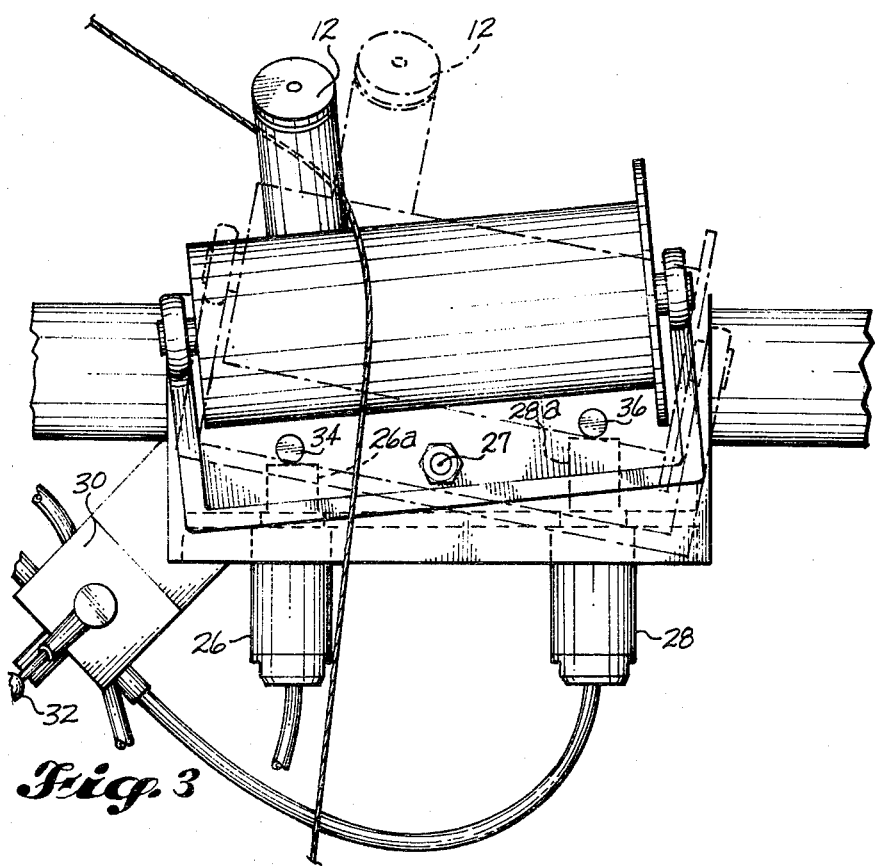
FIG. 3 is a top view of the apparatus shown in FIG. 2, illustrating the roller in different positions of orientation.

In accordance with the present invention, and by the means shown in FIGS. 1 to 4, the operator can eliminate or compensate for the prevailing ground line twisting action during the course of the haul simply by operating the control valve from time to time as necessary in order to change the orientation of the rotation axis of the guide roller 10 about pivot axis 26. For example, if the operator observes that the gangions are coming aboard wrapped in a counterclockwise direction around the line, he can simply flick the valve control lever 32 momentarily out of neutral position in the proper direction to reorient the guide roller 10 through a certain angular displacement until he observes the desired corrective action, then return the valve arm to neutral position. The tractional surface of the guide roller 10 turning in a plane out of the line-defined plane previously described, exerts a twisting or torsional force on the ground line. FIG. 3 shows by solid lines the guide roll in its most counterclockwise position wherein the ground line is induced to twist counterclockwise looking downwardly of the ascending stretch of line surfacing from the water. The view depicts by broken lines the clockwise-most position of the guide roll in which clockwise twisting of the ground line is induced by the guide roll in the process of hauling.

In the embodiment shown in FIG. 5, guide roller 100 is rotatively mounted between the ears 102 of a mounting bracket 104 by means of a pivotal element 108 defining a pivot axis 126. An adjustment screw 110 threads in a nut 116 revolvably mounted between the ears 118 of mounting bracket 104 at one end of such bracket. Accordingly, rotation in one direction or the other of control knob 112 on one end of screw 110 varies the line twisting effect of the guide roller 100. Upright keeper roll 120 appropriately secured in one of the journal supports 104a or 104b serves its usual function in the different angular positions of roller 100.

In FIG. 6 generally horizontal guide roll 200 is rotatively mounted at one end by means of an upright support plate 202 that in turn is pivotally supported at its lower edge on a transverse pivot shaft 204 extending athwarts of the vessel. At its opposite end the guide roll 200 is rotatively supported in a journal block 206 that is guided to move vertically in a slot formed in the upright flange 208a on the rail-mounted support base 208. Journal block 206 has a clevis portion pivotally retaining a nut 210 through which is threaded an adjustment screw 212 turned by a control handle 214. The lower end of the adjustment screw 212 is anchored rotatively in the horizontally extending end tab 216 on the mounting base 208. Rotation of the adjustment screw 214 in one direction or the other causes the adjacent end of the guide roller 202 to rise or descend and thereby undergo a change in the angular relationship thereof with the hauling plane, i.e., the plane defined by the ascending stretch of ground line and that stretch thereof which extends to the hauling block W (FIG. 1). It will thus be seen from a comparison of the embodiment in FIG. 6 with the embodiments shown in FIGS. 1 to 4 inclusive, and FIG. 5 respectively that controllable induced twisting of the ground line during hauling may be effected by changing the angular relationship between the guide roll axis and the hauling plane defined by the ground line stretches, by guide roll angular displacement either in the vertical plane or in the horizontal plane.

These and other variations and aspects of the invention are contemplated herein, such as shaping the roller surface, varying its material or texture, applying some drive torque or braking torque to the roller or to the keeper rollers, design refinements to provide fairing and otherwise shaping and positioning the parts and surfaces so that hooks do not catch on them during hauling, varying the specific means employed to displace the roller assembly into different control positions, etc. These will be evident to those skilled in this art based on an understanding of the foregoing disclosure of the presently preferred embodiments. It will be understood therefore, that the invention is not be construed as limited by the disclosed details, but in accordance with the claims that follow.

What is claimed is:

1. In combination with apparatus for hauling of long lines aboard a fishing vessel, operatively associated line guide means interposed to engage the line being hauled including a guide roller, vessel-mounted support means for the guide roller rotatively supporting the roller to form a roller bearing, said roller bearing having a substantially cylindrical line-engaging portion over which the ground line runs during hauling and that deflects the ground line in a plane defined by the line stretches respectively approaching and departing from said roller, said support means maintaining said guide roller with its rotational axis oriented generally at right angles to said plane and being angularly adjustable on the vessel to vary the angular orientation of said axis in relation to said plane, and control means connected to said support means and selectively operable during line hauling to adjustively vary the angular orientation of said guide roller axis in relation to said plane as a means to vary the twisting of said ground line by said guide roller.

2. The combination defined in claim 1, wherein the guide means are mounted at a station adjacent the vessel's rail, with the support means positioning the roller axis generally horizontal, and such that the approaching stretch of ground line is that which extends from the water to said roller.

3. The combination defined in claim 2, wherein the movable support means are operable to adjust the angular positioning of the guide roller about an upright axis.

4. The combination defined in claim 2, wherein the movable support means are operable to adjust the angular positioning of the guide roller about a horizontal axis extending athwarts of the vessel.

5. The combination defined in claim 2, wherein the control means comprises hydraulic piston and cylinder means, and control valve means manually operable to adjustively vary the angular positioning of the guide roller.

6. The combination defined in claim 2, with the line guide means further including at least one keeper roll mounted adjacent to the guide roller for rotating about an upright axis at a relative outboard location intermediate the ends of the guide roller.

7. The combination defined in claim 6, wherein the guide roller has a substantially straight cylindrical configuration contacted by the ground line during hauling.

* * * * *